United States Patent

[11] 3,630,785

| [72] | Inventors | Bruce Jagid<br>Whitestone;<br>Hong Po Louie, Brooklyn, both of N.Y. |
|---|---|---|
| [21] | Appl. No. | 718,895 |
| [22] | Filed | Apr. 4, 1968 |
| [45] | Patented | Dec. 28, 1971 |
| [73] | Assignee | Leesona Corporation<br>Warwick, R.I. |

[54] ANODE WITH A TWO LAYERED SEPARATOR
8 Claims, 3 Drawing Figs.

[52] U.S. Cl. ........................................ 136/120,
136/125, 136/147
[51] Int. Cl. ........................................ H01m 3/02,
H01m 13/06
[50] Field of Search ........................................ 136/120,
54, 63, 125, 30, 131, 132, 142–152, 24–26

[56] References Cited
UNITED STATES PATENTS
3,457,115 7/1969 Kent .......................... 136/86

3,253,954 5/1966 Banas .......................... 136/147

FOREIGN PATENTS
29,511 12/1909 Great Britain ................ 136/145
701,643 12/1953 Great Britain ................ 136/145

Primary Examiner—Winston A. Douglas
Assistant Examiner—M. J. Andrews
Attorney—Alfred W. Breiner ABSTRACT: An improved anode primarily for use in a metal/air or metal/oxygen cell is described. The anode comprises a porous metal body wrapped in a first layer of hydrophilic gas impermeable material, such as a cellulosic membrane, having a plurality of slits or holes therein. A second layer of material which is hydrophilic, dimensionally stable, and heat sealable, such as copolymers of vinylchloride and acrylonitrile is placed over or around the first layer of material.

PATENTED DEC 28 1971
3,630,785
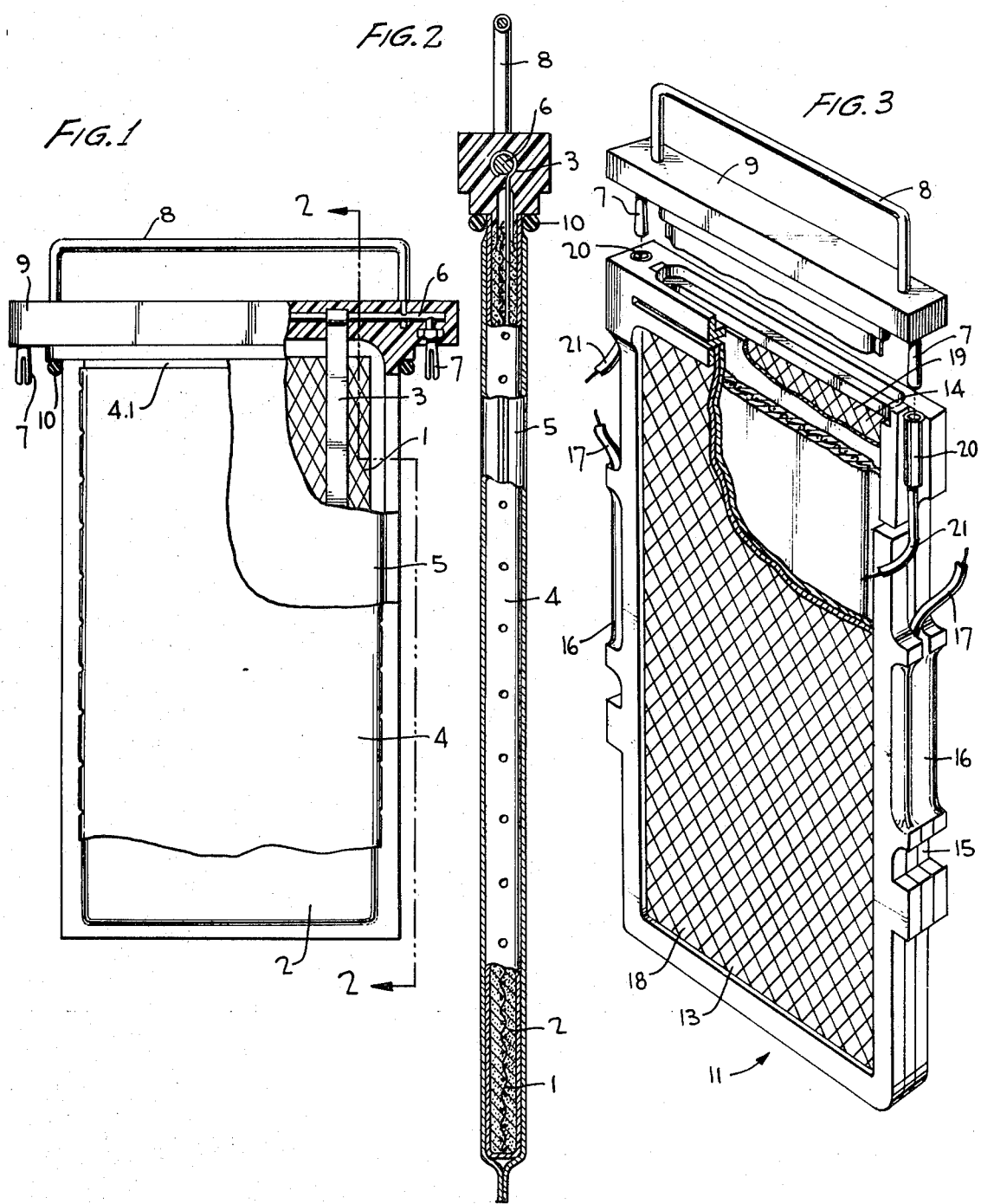
INVENTORS,
BRUCE JAGID
HONG PO LOUIE

ANODE WITH A TWO LAYERED SEPARATOR

FIELD OF INVENTION AND PRIOR ART

This invention is directed to electrochemical devices for generating electrical energy. More particularly, the invention is directed to an improved construction of porous metal anodes primarily for use in metal/air batteries.

Air or oxygen depolarized cells which have a high charge and discharge rate and which have a high energy to density and high energy to volume ratio have been described in commonly assigned Oswin copending application Ser. No. 533,516 filed Mar. 11, 1966. The ability to obtain the aforesaid features in a cell is primarily a result of the novel and highly efficient cathodes employed. These cathodes comprise a continuous hydrophobic polymer film which is coated on one surface with a layer of catalytic metal. In operation, the uncoated surface of the membrane is in contact with air or oxygen and the coated surface is in contact with the electrolyte of the cell which separates the cathode from the anode. The aforesaid cathodes have been employed with conventional metal anodes which comprise substantially solid plates, or porous bodies which may or may not contain a metal current collecting grid.

As a result of the high-discharge rate and depth of discharge of the anode, migration of the reactant species often occurs. In view of the compact construction of the cells utilizing a very minute space between the anode and cathode for retaining the electrolyte, even minor amounts of migration can detrimentally affect the cell performance. To prevent the migration of reactant species, a layer of hydrophilic material has been wrapped around the anode and utilized to retain the electrolyte of the cell. Although such cells are satisfactory for many applications, a more stable anode and one more resistant to handling was desirable particularly for use in cells of the type described in commonly assigned Oswin and Chodosh copending application Ser. No. 517,603 filed Dec. 30, 1965, now U.S. Pat. No. 3,436,270 which utilizes a replaceable anode permitting mechanical recharging. Such cells comprise a bicathode and a removable metal anode inserted into the bicathode. After the anode is discharged, the anode is removed and a fresh anode inserted. Accordingly, in commonly assigned Chodosh copending application Ser. No. 627,194 filed Mar. 30, 1967, an improved anode comprising a first wrap of hydrophilic gas impermeable material and a second wrap over the first wrap which comprised a hydrophilic gas and liquid permeable membrane is described. These anodes while being stable and resistant to handling have limitations in that electrolyte is slow to penetrate through the first wrap and into the anode. More recently in commonly assigned Rosansky copending application Ser. No. 702,658 filed Feb. 2, 1968, an anode containing "dry" electrolyte is described, again primarily for use in the Oswin et al. mechanically rechargeable cells. In the preferred operation of such cells utilizing the Rosansky anode, pure water is added to the bicathode followed by insertion of the dry electrolyte impregnated anode into the bicathode. This method of recharging is particularly desirable in that there is no need for an operator to handle the highly corrosive electrolyte. However, since the anode is merely displacing the water, unless the anode takes up the water quite rapidly the water will flow over the top of the bicathode with insufficient water being retained in the cell to saturate the anode completely to permit its full discharge.

OBJECTS AND BRIEF DESCRIPTION OF THE INVENTION

Accordingly, it is a primary object of the present invention to provide an improved metal anode.

It is another object of this invention to provide an improved porous metal anode permitting rapid discharge and recharge in a metal/air cell with substantially no migration of reactant species.

It is still another object of this invention to provide an improved replaceable porous metal anode for a metal/air battery capable of retaining sufficient liquid electrotype impregnated therein to permit full discharge of a cell utilizing the anode.

It is another object of this invention to provide a porous metal anode comprising a porous metal body wrapped in a first layer of material which is hydrophilic but impermeable to gases and particulate reaction species of the metal body and having a plurality of holes or slits therein.

It is another object of this invention to provide a porous metal anode comprising a porous metal body wrapped in a first layer of material which is hydrophilic but impermeable to gases and particulate reaction species of the metal body and having a plurality of holes or slits therein, and a second layer of material over the first layer which is hydrophilic, dimensionally stable and heat sealable.

It is another object of this invention to provide a method of manufacturing a porous metal anode comprising fabricating metal particles into a porous metal body, wrapping said metal body in a first layer of material which is hydrophilic but impermeable to gases and particulate reaction species of the metal body and having a plurality of holes or slits therein, and thereafter enclosing the wrapped metal body in a hydrophilic dimensionally stable, heat sealable material and encapsulating a plastic top on the anode sealing the wrapped anode.

These and other objects of the invention will become more readily apparent from the following detailed description, with particular emphasis being placed upon the drawing.

The aforesaid objects of the present invention are accomplished by fabricating a porous metal body using conventional procedures. For example, select metal particles can be compressed in a conventional manner under suitable conditions of elevated temperature and pressure to form an anode having the desired shape. The temperature and pressure employed are not particularly critical, provided complete sintering and coalescence of the particles do not occur. Temperatures at approximately the sintering temperature of the metal at the pressures employed are preferred. Alternatively, the metal particles can be dry mixed with a powdered resinous binder such as polytetrafluoroethylene. The admixture of metal particles and binder is compressed in a conventional manner, again under suitable conditions of elevated temperature and pressure to form an anode having the desired shape. The temperature depends upon the resin selected and pressure applied which is normally at from about 250 to 25,000 pounds per square inch. As a further alternative procedure, metal oxides can be placed in a suitable mold and the oxides reduced electrolytically or chemically to the anodic material and thereafter compressed to the desired thickness and shape, or the anode can be formed by slip casting. After the metal body is formed, it is wrapped in a hydrophilic material which is impermeable to gases and particulate species of the anode. The material employed, according to this invention, will have a plurality of openings, i.e., holes or slits, therein to facilitate the passage of water into the porous metal body. The openings can be arranged in the hydrophilic material to occur at various locations when covering the porous metal body, but preferably are arranged so that the openings occur along one side, along both sides, and/or at the bottom and top of the anode. According to a preferred embodiment, the top of the wrap will be cut away on one side so as to not extend completely to the top of the anode on the one side. The hydrophilic wrap will support the porous metal anode and will permit the passage of ions from the electrolyte to the anode but will not permit substantial gas passage to the anode or migration of the particulate reactant species. The openings in the wrap will permit the rapid entrance of liquid into the anode while simultaneously permitting air displaced from within the structure to leave the anode.

A second wrap, preferably in bag form, is placed around the anode. The second wrap is hydrophilic, dimensionally stable, and heat sealable. The material will help retain the electrolyte for operating the cell and improve the mechanical integrity and the performance of the anode. This material will not contain openings as does the first material. The anode can be rapidly discharged and recharged without detrimental change in shape or the like. This feature is of critical importance in metal/air cells where the cells are mechanically recharged as noted hereinbefore by removing the discharged anodes from an envelope cathode and inserting fresh anodes. The removed anodes can be externally recharged or discarded. When using the replaceable anodes, it is critical that oxygen does not reach the anode while the anode is being inserted in the cell or when the anode is taken out since oxygen will cause an anode such as porous zinc to ignite and burn up. Furthermore, it is necessary that the outer wrap permit convenient insertion and removal of the anode in the cell. All of these features are met by the presently described anode.

The metal powder used in making the anode described herein can be any conventional electroconductor employed as the anode material in an electrochemical cell. In the preferred embodiment where the improved anode is employed in a metal/air cell, it is essential that the metal selected be electrochemically reactive with a compatible electrolyte and be more electropositive than oxygen. Such materials include lead, zinc, iron, cadmium, aluminum, and magnesium. From the standpoint of cost, capacity, and convenience, zinc is a preferred material. As will be apparent in selecting the anode material, an important consideration is assurance that the material is compatible with the electrolyte of the cell. The particle size of the metal is not critical. Preferably, however, the metal selected will have a particle size of from about 0.5 to 40 mils in diameter. In the event a plastic binder is utilized, it should have a particle size of about the same magnitude as the metal particles or smaller. Normally, the binder which includes such materials as polytetrafluoroethylene, polyethylene, polyvinylchloride, polypropylene, copolymers of vinyl chloride and acrylonitrile, vinyl acetate, and the like, will comprise from about 0.5 to 18 percent by weight of the total admixture.

The first hydrophilic material containing the holes or slits wrapped around the metal anode body, while being hydrophilic, must preclude the passage of gases and particulate reaction species of the anode body. Such materials include the cellulosic membranes such as cellophane, unglycerinated desulfured fibrous cellulose, and the like. The second material employed which preferably is in bag form must be hydrophilic, dimensionally stable and heat sealable. This latter wrap functions to retain the metal body and first wrap intact and as a matrix for the cell electrolyte. Accordingly, the two layers having distinct characteristics are complementary of each other. The second wrap can be a fibrous synthetic material such as a copolymer of vinylchloride and acrylonitrile sold by the Union Carbide Corporation under the trade name Dynel, polyamide polymers, copolymers of polyvinylalcohol and polyvinylchloride, polyacrylate esters, and the like. The thickness of the wrap is not particularly critical, but should be as thin as possible in order to improve the energy to density ratio and energy to volume ratio as well as to minimize the internal resistance of the cells. The membranes preferably are from about 0.5 to 10 mils in thickness.

As a result of cost, complementary characteristics, and the like, the preferred anodic metal is zinc. The first wrap material is unglycerinated desulfured fibrous cellulose, and the second wrap is a copolymer of vinychloride and acrylonitrile. The first layer is gas impermeable and effectively retains the reaction species of the anode localized at the anode minimizing problems of migration even though holes or slits are arranged in the wrap. The second layer effectively retains the metal body and first layer intact and functions as an electrolyte matrix or the like. Furthermore, the material is dimensionally stable and heat sealable. When the anode prepared as described is employed in an air depolarized cell, greatly enhanced performance from the standpoint of rapid discharge and recharge, structural integrity, and the like, is realized.

The improvement in the anode construction in accordance with the present invention will be more readily apparent by reference to the drawing wherein like numerals are employed throughout to designate like parts.

THE DRAWING

In the drawing:

FIG. 1 is a front view of an anode partially in section and partly broken away;

FIG. 2 is a view partly in cross section taken along line 2—2 of FIG. 1; and

FIG. 3 is a partially exploded view of an air depolarized cell utilizing an anode as shown in FIGS. 1 and 2.

More specifically, referring primarily to FIGS. 1 and 2, a metal grid current collector 1 which conveniently is a metal screen is utilized as the center or support for a metal body 2. Current collector tabs 3, which preferably are silver strips approximately ⅛ by 0.010 inches thick, are placed on the metal screen so that they extend beyond the metal screen. The metal body is made by mixing zinc oxide and mercury oxide at a weight ratio of 98 percent zinc to 2 percent mercury based on the metal. A separator material such as a copolymer of vinyl chloride and acrylonitrile is placed in a mold. The admixture of zinc oxide and mercury oxide is placed on the paper in the mold and leveled to approximately one-half the thickness of the desired anode. A conductive silver screen 1 and silver current collecting tabs 3 are placed over the mixture and, thereafter, the remainder of the admixture of zinc oxide and mercury oxide added. The metal oxide powders are lightly compacted and the separator paper sealed. The structure is placed in a tank of 5 percent aqueous potassium hydroxide and electrolytically reduced at a current density of 0.19 amps per square inch over a period of approximately 8 hours. After the reduction, the anode is washed to remove excess potassium hydroxide and the structure pressed to the thickness desired and dried to give a porous structure. Thereafter, a layer of desulfurized fibrous cellulose 4 0.003 inch in thickness having plurality of holes therein was wrapped around the porous body in order that the holes were located at the end of the anode. As seen in FIG. 1, wrap 4 is cut away at 4.1 on one side only so that this side of the first wrap is not sealed by the anode top. A bag 5 composed of a copolymer of vinyl chloride and acrylonitrile having a membrane thickness of 0.004 inch was employed to enclose the wrapped porous metal body. The silver current collector tabs 3 which are on either end of the anode were placed in contact with a buss bar 6 which was in contact with plugs 7. A handle 8 was attached to the buss bar. Thereafter, a nonconductive plastic anode top 9 was encapsulated over the buss bar around the base of terminal 7, sealing the buss bar 6, handle 8 and the top part of bag 5 in position. An O-ring composed of Buna-n rubber 10 circumscribes an indentation in the plastic anode top. The base of the anode is 2.5 inches wide and 0.12 inch thick. The top of the anode, i.e., the plastic anode top, is 3.2 inches wide and 0.32 inch thick. The anode has a height of 6.5 inches.

FIG. 3 illustrates a metal/air cell utilizing an anode of the type shown in FIGS. 1 and 2. The cell module comprises an envelope cathode 11 made up of a bicell frame 12 and reactive cathodes 13 and 14. The frame shown contains cell guide supports 15 which are to facilitate the positioning of the cell module in a battery casing and moldings 16 which house positive leads 17 which are in electrical contact with the cathode. In the embodiment shown, the cathode is made up of a continuous hydrophobic membrane 18, a conductive support screen 19, and an electrocatalyst layer pressed into and around the support screen. The hydrophobic membrane is polytetrafluoroethylene and the electrocatalyst is a uniform admixture of platinum and polytetrafluoroethylene particles. The catalyst and bonding agent are present at a weight ratio of 10 parts to three parts. The anode fits into the envelope cathode and is locked into position by negative terminals 7 which fit into negative terminal jacks 20 of the envelope cathode. The terminals are in electrical contact with the anode body by silver current collecting tab 3 as noted hereinbefore. The handle 8 is employed to facilitate removal of the anode. Negative leads 21 emerge from the jack terminal at each side of the cell.

According to the preferred embodiment of this invention, the anode comprising the porous metal body and the wrapping materials which weigh a total of approximately 15 grams is carefully impregnated with 11 grams of a 35 weight percent aqueous solution of potassium hydroxide. After the impregnation, the electrode is placed in a convection oven maintained at 130° C. for a period of 35 minutes to drive off the water in the electrolyte to provide an electrode uniformly, or substantially uniformly impregnated with "dry" electrolyte The electrode can be inserted directly into an electrochemical cell and the cell activated at the desired time by raising the anode and adding water, or the electrode can be bagged in a plastic container, or the like, and stored dry until it is to be used in a metal/air cell. When the cell is activated by pouring water into the envelope cathode, the water is quickly adsorbed by the anode as a result of the holes or slits in the first wrap. As the anode is inserted into the envelope cathode, water enters the electrode at the bottom where it is adsorbed, and displaced gas from within the anode released from the anode through the holes or slits in the wrap which are above the water level and through cutaway 4.1, permitting extremely rapid activation of the cell.

In the aforesaid embodiment, the zinc oxide and mercury oxide particles can be replaced by other metal oxide particles which are compatible with the electrolyte of the cell and which are more electropositive than oxygen. Thus, the zinc oxide powder can be replaced with oxides of lead, iron, cadmium, aluminum, and magnesium powders. Furthermore, the metal particles themselves, or the metal particles in admixture with a resinous binder, can be employed. Additionally, the unglycerinated desulfurized fibrous cellulose membrane can be replaced with other cellulosic membranes, and the second wrapping can be replaced with fibrous polyamide membranes, copolymers of vinylchloride and polyvinylalcohol, and the like. It should be appreciated that the instant invention is not to be construed as being limited by the illustrative embodiment. It is possible to produce still other embodiments without departing from the inventive concept herein disclosed. Such embodiments are within the ability of one skilled in the art.

It is claimed:

1. An anode for an electrochemical cell comprising a porous anodic body which is continuous from top to bottom and from side to side, said body being substantially completely wrapped in first and second layers of different and distinct materials, the material of said first layer being gas impermeable, hydrophilic, and ion permeable to permit the passage of aqueous electrolyte and ions while preventing passage of substantial gaseous or particulate species, said first layer being substantially completely contiguous with said body and having plurality of openings therein sufficient to enhance the absorption of electrolyte by said body while still preventing passage of substantial gaseous or particulate species, and the material of said second layer which is substantially completely contiguous with said first layer being hydrophilic, dimensionally stable, and heat sealable.

2. The anode of claim 1 wherein the first layer is cut away to expose said body at the top at one side of the anode.

3. The anode of claim 2 wherein the second layer is in bag form and heat sealed at the top thereof.

4. The anode of claim 3 wherein the plurality of openings in said first layer are arranged to conform to an edge of said anode.

5. The anode of claim 1 wherein the metal body includes a metal selected from the group consisting of lead, zinc, iron, cadmium, aluminum, and magnesium.

6. The anode of claim 1 wherein the anodic metal body includes zinc.

7. The anode of claim 1 wherein the anodic metal body includes zinc, the first layer is composed of unglycerated desulfurized fibrous cellulose and the second layer is in bag form and is composed of a copolymer of vinylchloride and acrylonitrile.

8. The anode of claim 1 wherein the material of said first layer is a cellulosic material and the material of said second layer is a thermoplastic material.

* * * * *